(12) United States Patent
Morris

(10) Patent No.: US 8,166,594 B1
(45) Date of Patent: May 1, 2012

(54) COUNTERBALANCE MECHANISM FOR FOLD OUT RAMP

(75) Inventor: Donald Morris, Littleton, CO (US)

(73) Assignee: Lift-U, Division of Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 12/951,713

(22) Filed: Nov. 22, 2010

Related U.S. Application Data

(60) Provisional application No. 61/265,627, filed on Dec. 1, 2009.

(51) Int. Cl.
*E01D 1/00* (2006.01)

(52) U.S. Cl. ............................. 14/71.3; 14/71.1; 414/921

(58) Field of Classification Search .............. 74/53, 567, 74/569, 603; 414/921; 14/71.1, 71.3
See application file for complete search history.

(56) References Cited

U.S. PATENT DOCUMENTS

| | | | | |
|---|---|---|---|---|
| 4,503,722 A * | 3/1985 | Suzuki et al. | ...................... | 74/96 |
| 4,726,253 A | 2/1988 | Russell | | |
| 5,111,912 A * | 5/1992 | Kempf | ........................... | 187/250 |
| 5,391,041 A * | 2/1995 | Stanbury et al. | .............. | 414/537 |
| 5,488,757 A | 2/1996 | Cohen | | |
| 5,718,406 A | 2/1998 | Long | | |
| 5,871,329 A | 2/1999 | Tidrick | | |
| 6,179,545 B1 * | 1/2001 | Petersen et al. | ................ | 414/537 |
| 6,298,569 B1 | 10/2001 | Raab | | |
| 6,364,275 B1 | 4/2002 | Lindsay | | |
| 6,474,287 B2 | 11/2002 | Babington | | |
| 6,602,041 B2 * | 8/2003 | Lewis et al. | .................... | 414/537 |
| 6,843,635 B2 * | 1/2005 | Cohn | ............................. | 414/549 |
| 7,017,220 B2 * | 3/2006 | Alexander et al. | .............. | 14/69.5 |
| 7,533,432 B2 * | 5/2009 | Morris et al. | ................... | 14/71.3 |
| 7,533,433 B2 * | 5/2009 | Morris et al. | ................... | 14/71.3 |
| 7,533,434 B2 * | 5/2009 | Morris et al. | ................... | 14/71.3 |
| 7,681,272 B2 | 3/2010 | Morris | | |
| 7,870,631 B2 * | 1/2011 | Morris et al. | ................... | 14/71.3 |
| 7,913,341 B1 * | 3/2011 | Morris et al. | ................... | 14/71.3 |
| 7,913,342 B1 * | 3/2011 | Morris et al. | ................... | 14/71.3 |
| 7,913,343 B1 * | 3/2011 | Cohn | ............................. | 14/71.3 |
| 8,020,234 B2 * | 9/2011 | Johnson et al. | ................ | 14/71.3 |
| 8,032,963 B2 * | 10/2011 | Morris et al. | ................... | 14/71.3 |

(Continued)

OTHER PUBLICATIONS

Fall Protection Systems, Inc. Flat Ramp <http://www.fallprotectionsystems.com/access_systems.html> [retrieved on Nov. 18, 2010].

*Primary Examiner* — Gary S Hartmann
(74) *Attorney, Agent, or Firm* — Christensen O'Connor Johnson Kindness PLLC

(57) ABSTRACT

A ramp assembly has a ramp portion configured for reciprocating movement between a stowed position, a deployed position, and a neutral position. The weight of the ramp portion biases the ramp portion (1) toward the deployed position when the ramp portion is between the deployed position and the neutral position, and (2) toward the stowed position when the ramp portion is between the stowed position and the neutral position. A counterbalance for the ramp assembly includes a cam configured to rotate when the ramp portion moves between the stowed position and the deployed position. A cam follower is slidingly coupled to a guide and engages a surface of the cam so that rotation of the cam translates the cam follower along a path. The counterbalance further includes a resistance member coupled to the cam follower to provide a force to the cam follower to counteract the ramp moment.

11 Claims, 10 Drawing Sheets

U.S. PATENT DOCUMENTS

| | | | |
|---|---|---|---|
| 2001/0048870 A1* | 12/2001 | Lewis et al. | 414/537 |
| 2004/0096304 A1* | 5/2004 | Lewis et al. | 414/537 |
| 2005/0060821 A1 | 3/2005 | Alexander | |
| 2008/0271266 A1* | 11/2008 | Johnson | 14/71.1 |
| 2008/0271267 A1* | 11/2008 | Morris et al. | 14/71.1 |
| 2008/0271268 A1* | 11/2008 | Johnson | 14/71.1 |
| 2008/0271269 A1* | 11/2008 | Morris et al. | 14/71.1 |
| 2011/0088179 A1* | 4/2011 | Morris et al. | 14/71.3 |

\* cited by examiner

COUNTERBALANCE MECHANISM FOR FOLD OUT RAMP

CROSS-REFERENCES TO RELATED APPLICATIONS

This application claims the benefit of U.S. Provisional Application No. 61/265,627, filed on Dec. 1, 2009, the disclosure of which is expressly incorporated by reference.

TECHNICAL FIELD

The present disclosure relates generally to wheelchair lifts and, more particularly, to fold out ramps for vehicles.

BACKGROUND

The Americans with Disabilities Act (ADA) requires the removal of physical obstacles to those who are physically challenged. The stated objective of this legislation has increased public awareness and concern over the requirements of the physically challenged. Consequentially, there has been more emphasis on providing systems that assist such people to access a motor vehicle, such as a bus or minivan.

A common manner of providing the physically challenged with access to motor vehicles is a ramp. Various ramp operating systems for motor vehicles are known in the art. Some slide out from underneath the floor of the vehicle and tilt down. Others are stowed in a vertical position and are pivoted about a hinge, while still others are supported by booms and cable assemblies. The present invention is generally directed to a "fold out" type of ramp. Such a ramp is normally stowed in a horizontal position within a recess in the vehicle floor, and is pivoted upward and outward to a downward-sloping extended position. In the extended position, the ramp is adjustable to varying curb heights.

Fold out ramps on vehicles confront a variety of technical problems. Longer ramps are desirable because the resulting slope is more gradual and more accessible by wheelchair-bound passengers. Longer ramps are, however, heavier and require more torque about the hinge to be reciprocated between deployed and stowed positions. To satisfy this torque requirement, such fold-out ramps use large electric motors, pneumatic devices, or hydraulic actuators to deploy and stow the ramp. Many of such systems cannot be moved manually in the event of failure of the power source unless the drive mechanism is first disengaged. Some existing fold-out ramps can be deployed or stowed manually, but they are difficult to operate because one must first overcome the resistance of the drive mechanism.

As noted above, many existing fold-out ramps are equipped with hydraulic, electric, or pneumatic actuating devices. Such devices are obtrusive and make access to and from a vehicle difficult when the ramp is stowed. Moreover, many of such fold-out ramps have no energy storage capabilities to aid the lifting of the ramp, and thereby preserve the life of the drive motor or even allow a smaller drive to be employed. Finally, operating systems for such fold-out ramps must have large power sources to overcome the torque placed on the hinge by the necessarily long moment arm of the fold-out ramp.

SUMMARY

A ramp assembly includes a ramp portion configured for reciprocating movement between a stowed position, a deployed position, and a neutral position. The ramp the ramp portion has a weight that produces a ramp moment, wherein the ramp moment biases the ramp portion (1) toward the deployed position when the ramp portion is between the deployed position and the neutral position, and (2) toward the stowed position when the ramp portion is between the stowed position and the neutral position. The ramp assembly also has a counterbalance. The counterbalance includes a cam configured to rotate when the ramp portion moves between the stowed position and the deployed position. A guide is coupled to the ramp assembly, and a cam follower is slidingly coupled to the guide. The cam engages a surface of the cam so that rotation of the cam translates the cam follower along a path. A resistance member is coupled to the cam follower and provides a force to the cam follower to counteract the ramp moment.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Exemplary embodiments of the present invention will now be described with reference to the accompanying drawings where like numerals correspond to like elements. The disclosed embodiments are directed to ramp assemblies, and specifically, to wheelchair ramp assemblies. In particular, described embodiments are directed to wheelchair ramp assemblies suitable for use in buses, vans, etc.

The following discussion proceeds with reference to examples of wheelchair ramp assemblies for use in vehicles having a floor, such as a bus, van, etc. While the examples provided herein have been described with reference to their association with vehicles, it will be apparent to one skilled in the art that this is done for illustrative purposes and should not be construed as limiting the scope of the claimed subject matter. Thus, it will be apparent to one skilled in the art that aspects of the present disclosure may be employed with other ramp assemblies used in stationary installations, such as residential buildings and the like.

The following detailed description may use illustrative terms such as vertical, horizontal, front, rear, curbside, roadside, inboard, outboard, proximal, distal, etc. However, these terms are descriptive in nature and should not be construed as limiting. Further, it will be appreciated that embodiments of the present disclosure may employ any combination of features described herein.

Figure 1:
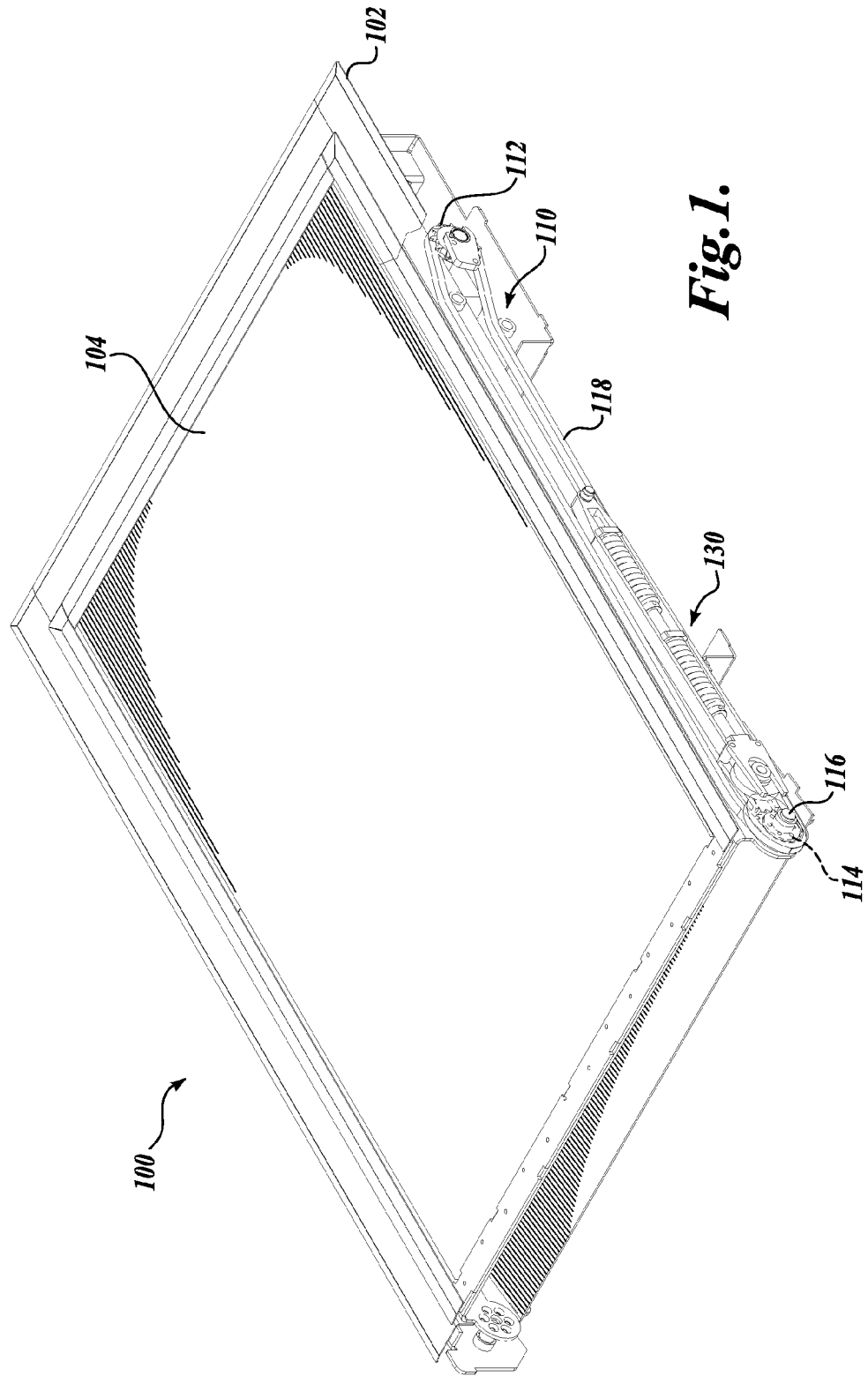
FIG. 1 shows an isometric view of a fold out ramp having a counterbalance mechanism, wherein a ramp portion is shown in the stowed position.
Figure 2:
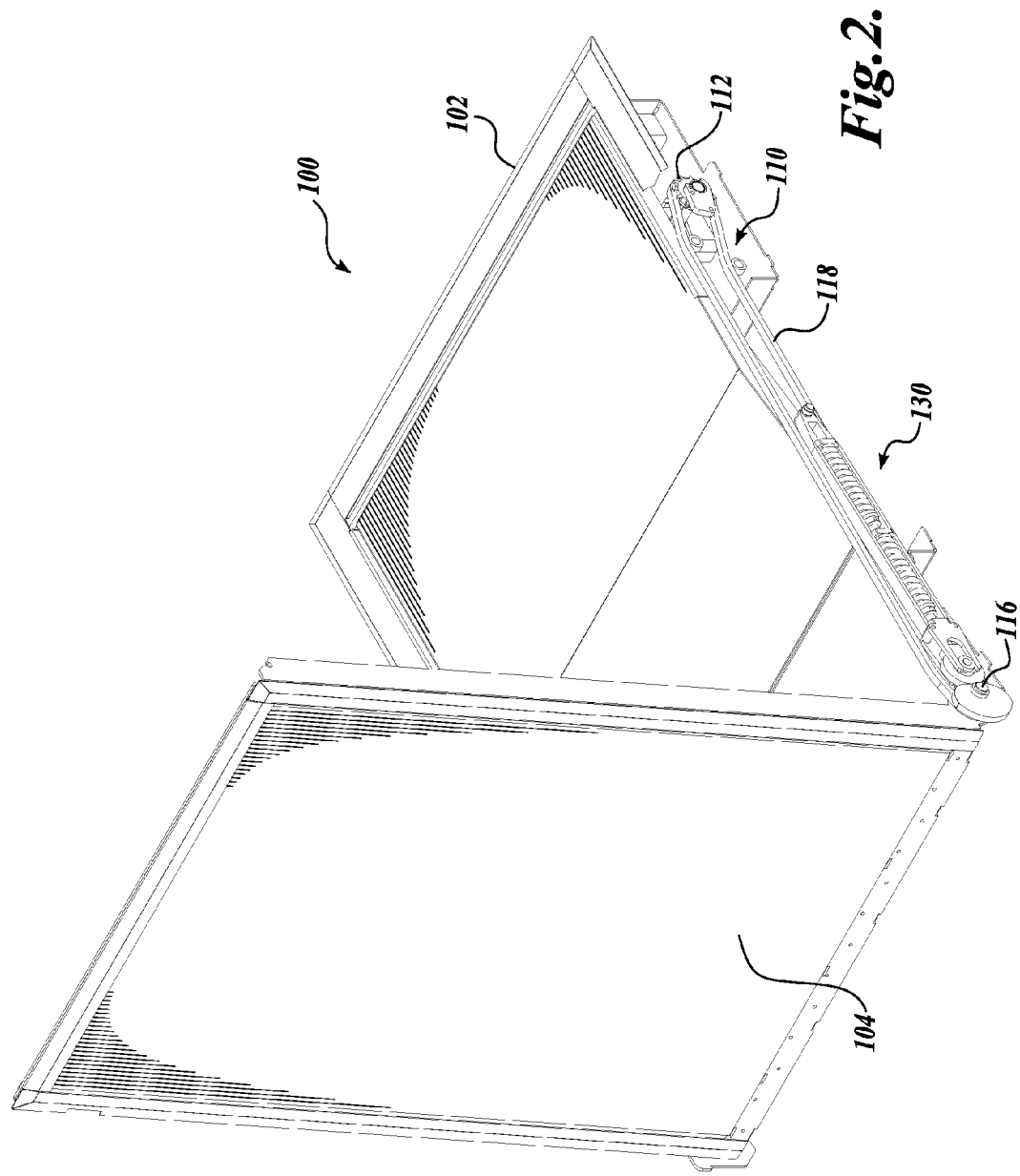
FIG. 2 shows an isometric view of the fold out ramp of FIG. 1, with the ramp portion located between the stowed position and a deployed position.
Figure 3:
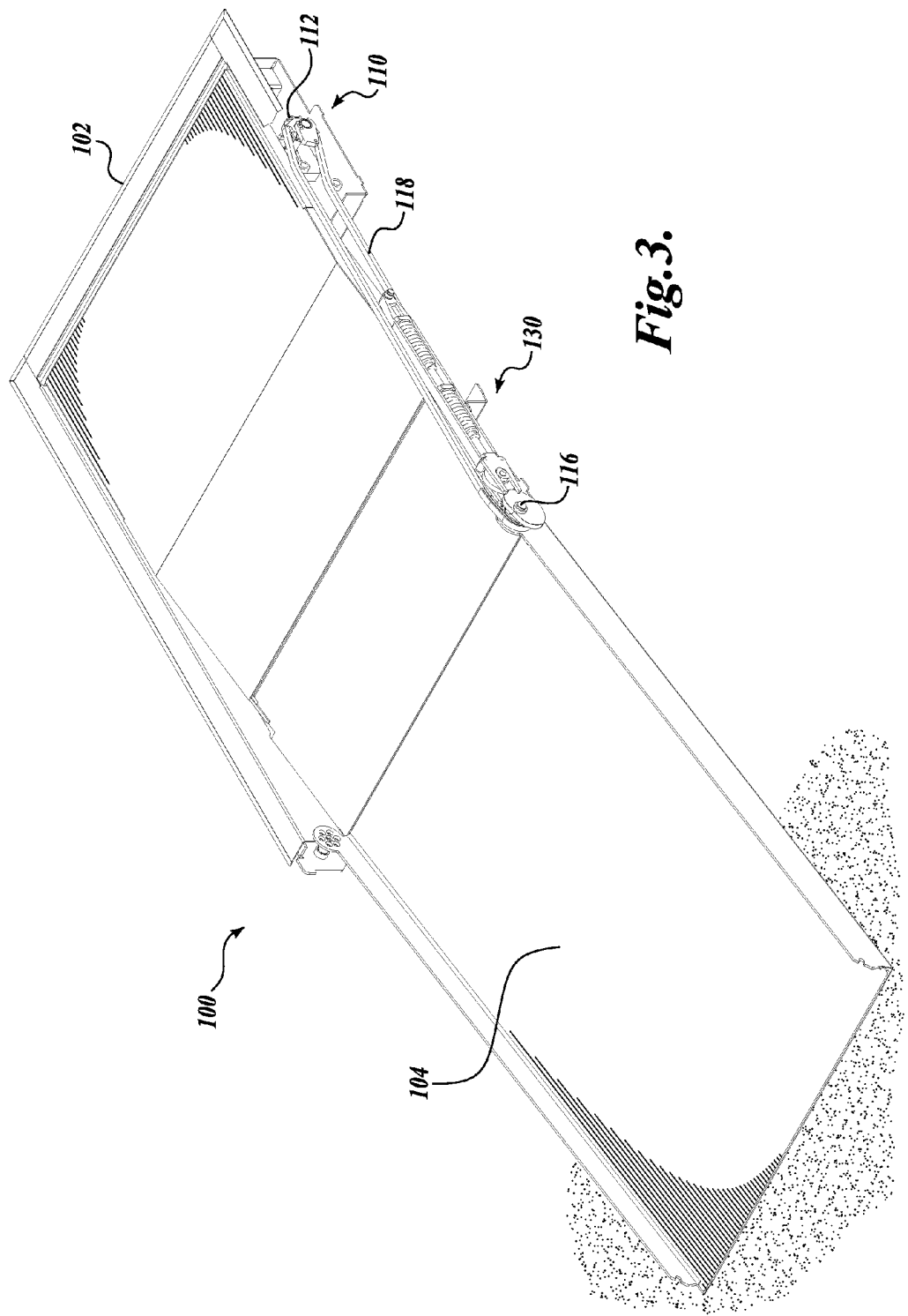
FIG. 3 shows an isometric view of the fold out ramp of FIG. 1, with the ramp portion in a deployed position.

FIGS. 1-3 illustrate an exemplary embodiment of a fold out ramp assembly 100 (hereinafter the "ramp assembly") suitable for use with the described counterbalance assemblies. The ramp assembly 100 is adapted to be mounted to a vehicle (not shown), such as a bus or a van and includes a ramp portion 104. The ramp portion 104 is mounted to be rotatable about one end so that the ramp portion 104 is reciprocal between the stowed position, as shown in FIG. 1, and a deployed position, as shown in FIG. 3.

When a ramp assembly is installed in a vehicle, some components of the ramp assembly 100 may maintain a fixed relationship relative to the vehicle structure, while other components move relative to the vehicle structure when the ramp reciprocates between a stowed position and a deployed position. Similarly, when a ramp assembly is installed in a stationary installation, such as a residential building and the like, some components of the ramp assembly may maintain a fixed relationship relative to the building structure, while other components move relative to the building structure when the ramp reciprocates between a stowed position and a deployed position. As illustrated, the ramp assembly of FIGS. 1-3 includes a fixed portion 102. For such embodiments, the fixed portion 102 of the ramp assembly 100 maintains a fixed relationship to the vehicle or other structure to which the ramp assembly is mounted. It will also be appreciated that the fixed portion of the ramp assembly also maintains a fixed relationship to any defined ramp position. That is, the fixed portion 102 of the ramp assembly 100 can be described as having a fixed relationship to the stowed position of the ramp portion, i.e., to the ramp portion when the ramp portion is in the stowed position. Similarly, the fixed portion of the ramp assembly can be described as having a fixed relationship to the neutral position of the ramp portion, which is the position in which the center of gravity of the ramp portion 104 is positioned so that the weight of the ramp portion does not impart a moment on the ramp portion. Alternate embodiments that do not include a fixed portion are also possible. For such embodiments, the ramp portion is rotatably coupled directly to a portion of the vehicle or other structure to which the ramp assembly is mounted.

Movement of the ramp portion 104 is powered by a motor (not shown), which is operatively coupled to the ramp portion with a transmission assembly 110. The transmission assembly includes a roadside sprocket 112 operatively coupled to the drive shaft of the motor and located toward the roadside portion of the ramp assembly 100. A curbside sprocket 114 is positioned along the curbside end of the ramp assembly. In the illustrated embodiment, the curbside sprocket 114 is fixedly coupled to an output shaft 116. The output shaft 116 is operatively coupled to the ramp portion so that rotation of the output shaft 116 in a first direction actuates the ramp portion towards the stowed position, and rotation of the output shaft in a second direction actuates the ramp portion towards a deployed position. A chain 118 forms an endless loop that engages the curbside sprocket 114 and the roadside sprocket 112 so that rotation of the roadside sprocket rotates the output shaft 116, thus actuating the ramp portion.

The illustrated transmission assembly is exemplary only and should not be considered limiting. For example, although the transmission assembly 110 is described as a combination of sprockets 112 and 114 and a chain 118, other known transmission assemblies may be utilized, including but not limited to a plurality of gears, a belt and pulleys, etc. It is also anticipated that the drive shaft of the motor can be directly coupled to the ramp portion to provide an actuating force to the ramp portion. It will be apparent to one of ordinary skill the art that these and other variations to the transmission assembly are possible. Accordingly, such alternate embodiments should be considered within the scope of the present disclosure.

Figure 5:
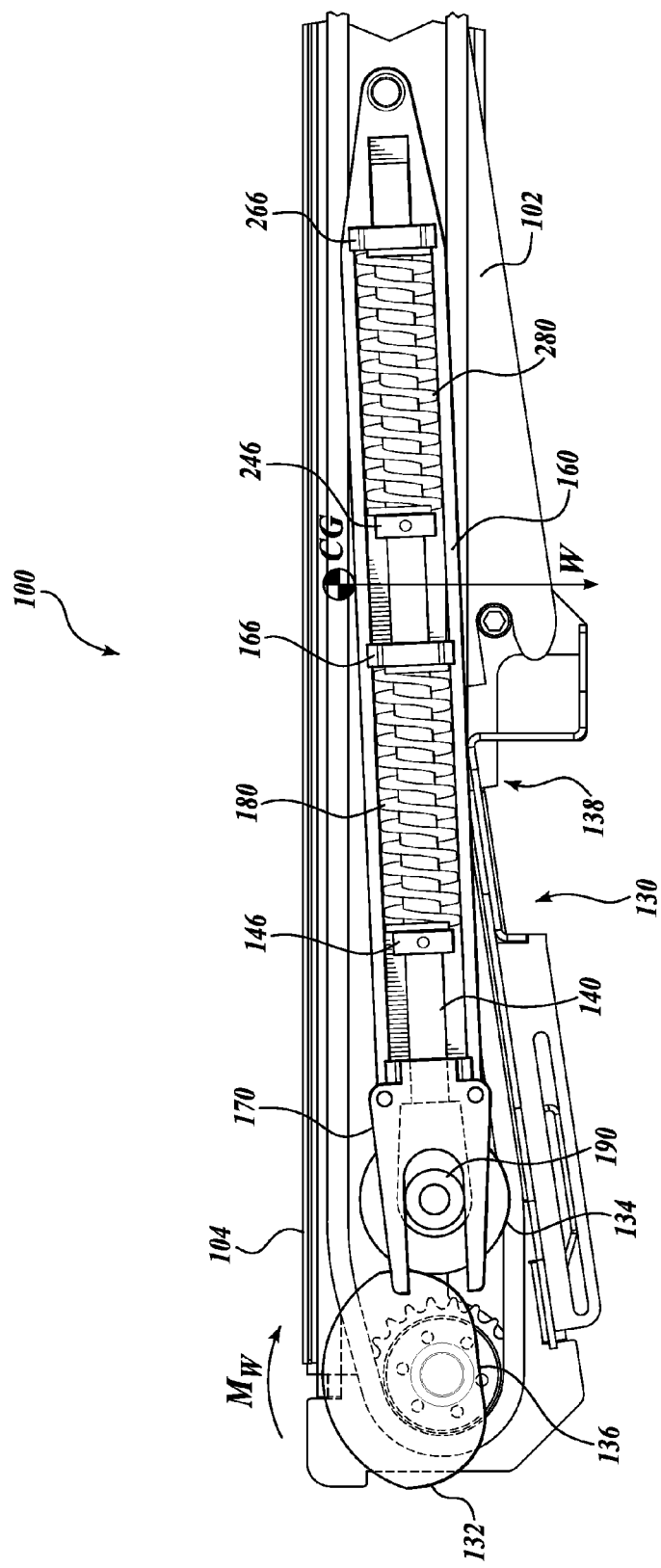
FIG. 5 shows a side view of the counterbalance assembly of FIG. 4, with the ramp portion in the stowed position.
Figure 6:
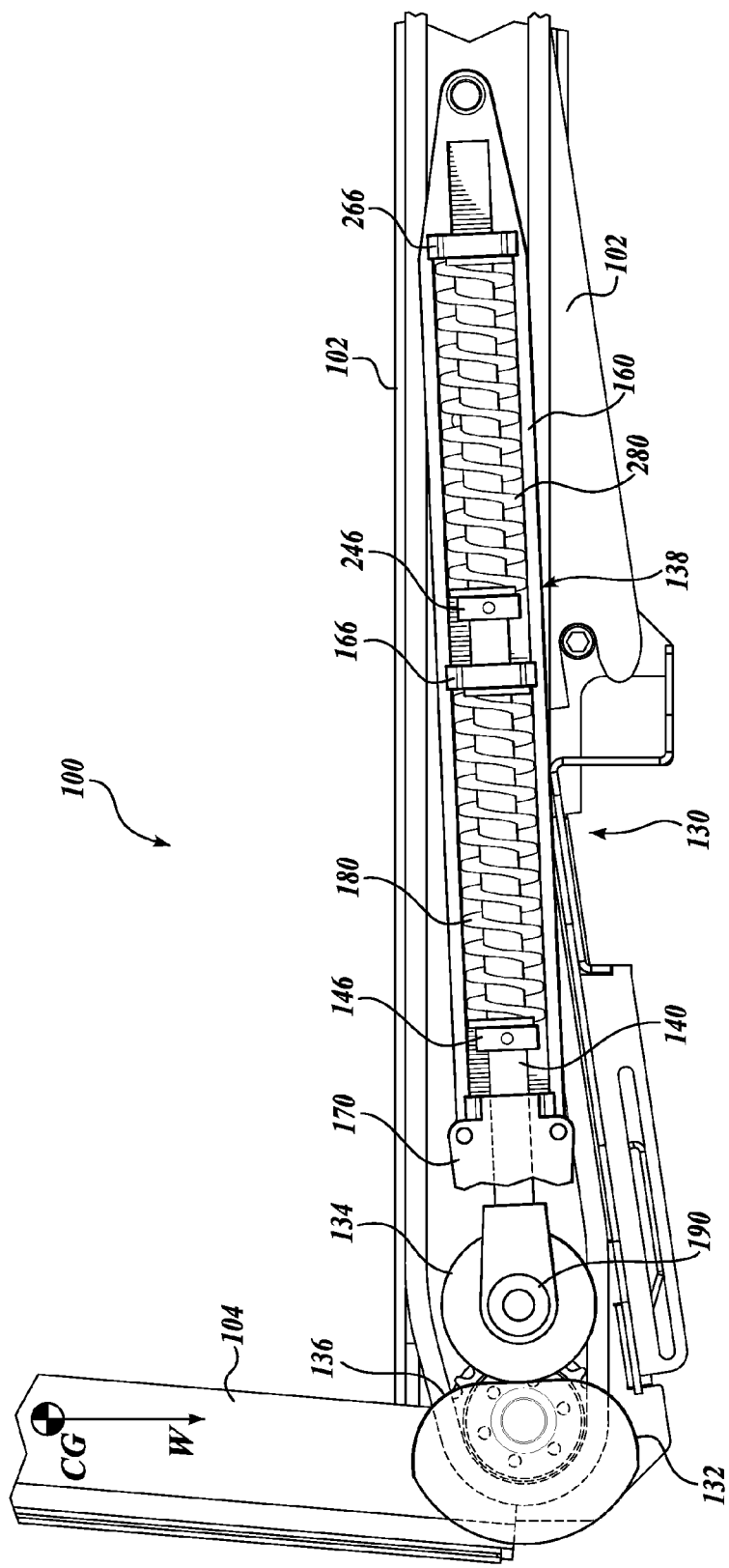
FIG. 6 shows a side view of the counterbalance assembly of FIG. 4, with the ramp portion in a neutral position.
Figure 7:
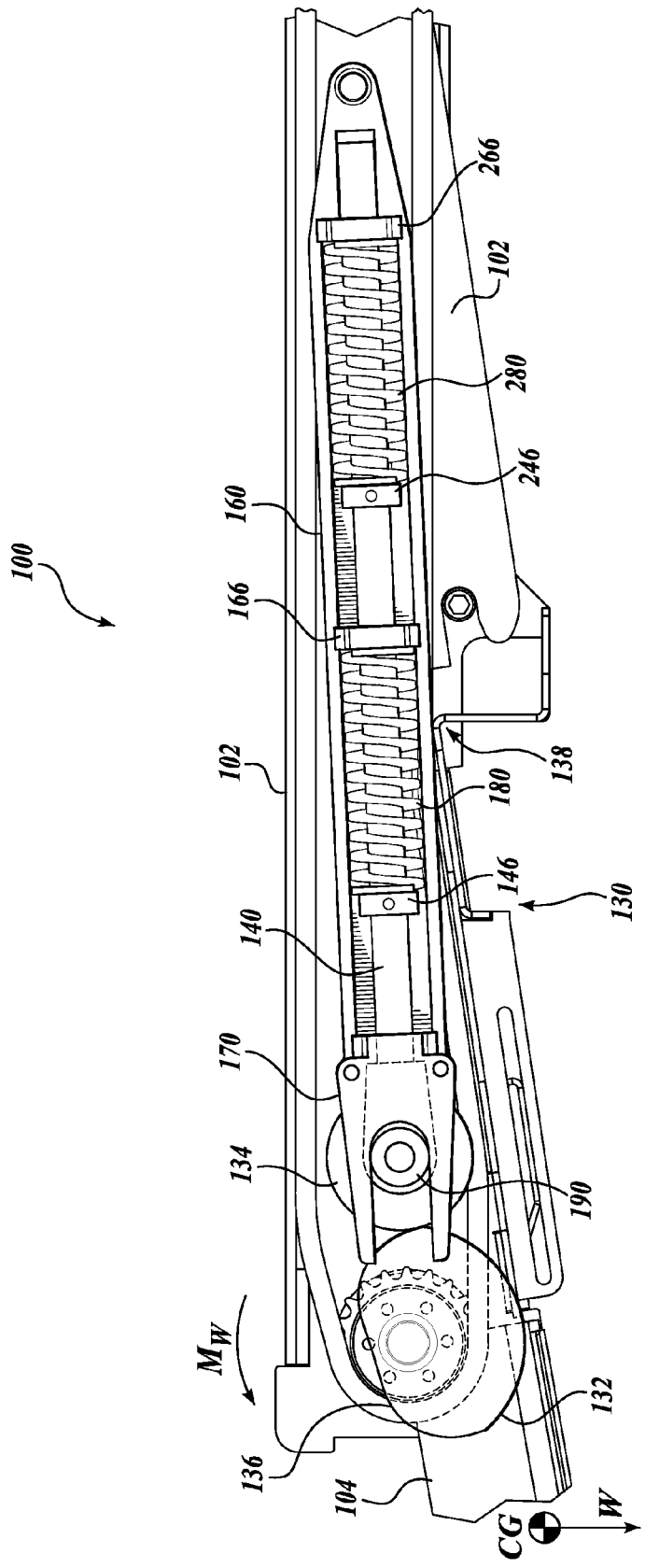
FIG. 7 shows a side view of the counterbalance assembly of FIG. 4, with the ramp portion in a deployed position.

In the illustrated embodiment, the output shaft 116 serves as a pivot axis for the ramp portion 104. That is, the axis of rotation of the output shaft 116 is coincident to the center of rotation of the ramp portion 104 as the ramp portion reciprocates between the stowed position and a deployed position. It should be appreciated that the output shaft 116 need not be so located. One of ordinary skill in the art would recognize that the location and orientation of the output shaft 116 can differ with the inclusion of various known transmission elements to couple the output shaft 116 to the ramp portion 104. Also envisioned are embodiments wherein the driveshaft that couples the motor to the roadside sprocket 112 acts as an output shaft 116, i.e., the shaft to which the counterbalance 130 is attached. Such a configuration would allow the counterbalance assembly to be located internal to the ramp assembly 100, i.e. under the ramp portion 104 when the ramp portion is in the stowed position. It should be appreciated that the output shaft 116 can be any shaft associated with the ramp assembly 100 that rotates in a first direction when the ramp portion 104 moves toward the stowed position and in a second direction when the ramp portion moves toward a deployed position. FIGS. 5-7 show the ramp assembly 100 as the ramp portion 104 rotates from the stowed position (FIG. 5) through the neutral position (FIG. 6) to a deployed position (FIG. 7). Referring to FIG. 5, when the ramp is in the stowed position, the weight of the ramp portion 104, which is idealized as a force W acting at the center of gravity (CG) of the ramp portion, is positioned roadside of the center of rotation of the ramp portion 104 and imparts a moment $M_W$ on the ramp portion 104 (a "ramp moment") that tends to rotate the ramp portion away from the neutral position and toward the stowed position. Similarly, when the ramp portion 104 is in a deployed position, as shown in FIG. 7, the weight W of the ramp portion imparts a ramp moment $M_W$ on the ramp portion that tends to rotate the ramp portion away from the neutral position and toward the deployed position. The ramp moment $M_W$ is the product of the weight W of the ramp portion 104 multiplied by moment arm $d_w$, which is the horizontal distance between the center of rotation and the CG of the ramp portion 104. As the ramp portion 104 moves from either the stowed position or a deployed position toward the neutral position, the moment arm $d_w$ decreases according to the cosine of the angle of the ramp portion relative to a horizontal plane. As a result, the ramp moment $M_W$ also decreases according to the cosine of the angle of the ramp portion relative to a horizontal plane as the ramp portion 104 moves toward the neutral position.

As shown in FIG. 6, when the ramp portion 104 is in the neutral position, the CG of the ramp portion 104 is located directly over the center of rotation of the ramp portion 104, i.e., $d_w=0$. As a result, the weight W of the ramp portion 104 does not impart any moment about the center of rotation of the ramp portion 104. In the illustrated embodiment, the neutral position is depicted as occurring when the ramp is in a substantially vertical position. It should be appreciated, however, that the position of the CG can vary according to the configuration of the ramp portion 104. Accordingly, the neutral position, i.e. the position at which the CG is located above the center of rotation of the ramp portion 104, can also vary according to the configuration of the ramp portion 104.

Figure 4:
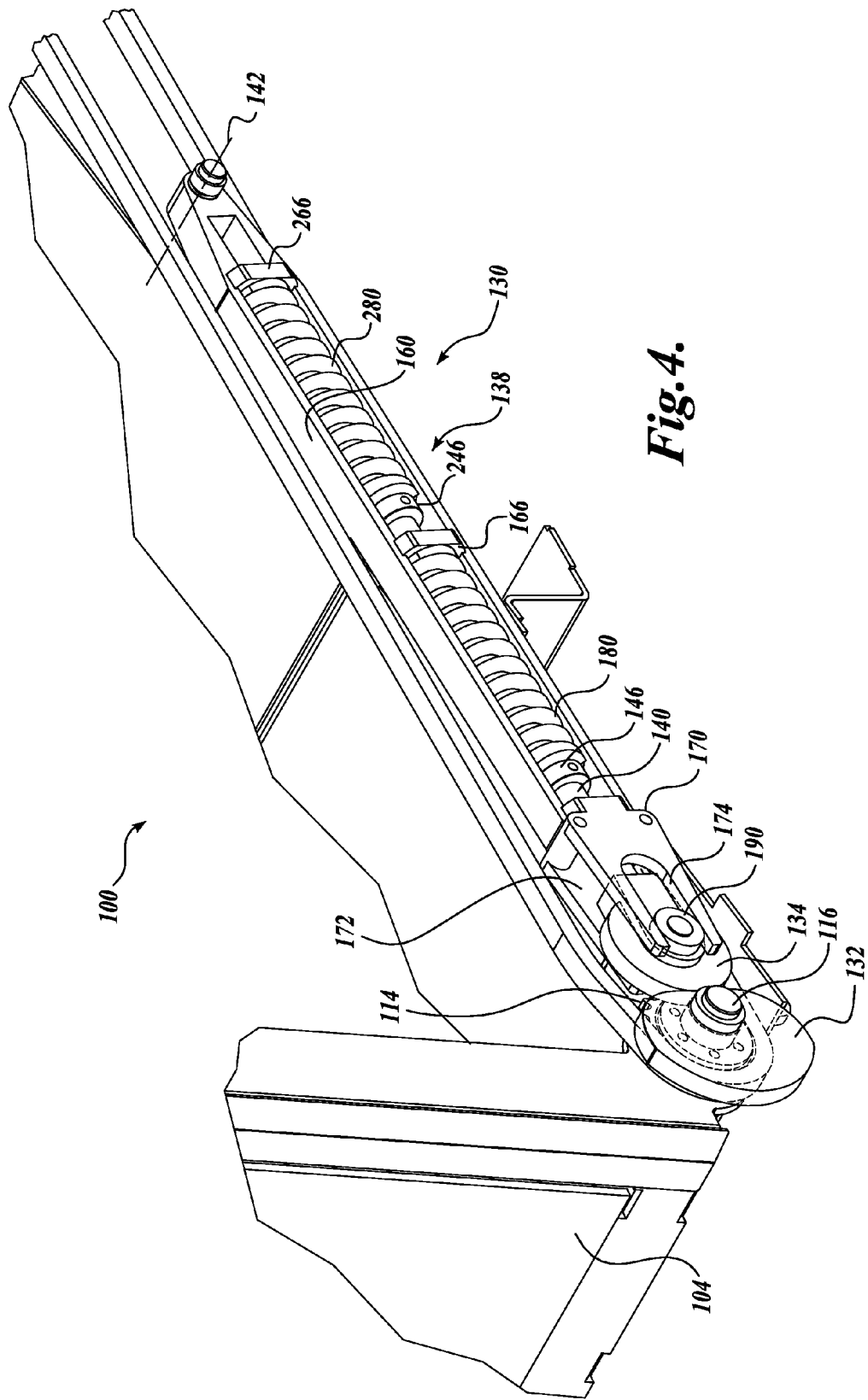
FIG. 4 shows an isometric view of a first exemplary embodiment of the counterbalance assembly of FIG. 1.

Referring now to FIGS. 4-7, a first exemplary embodiment of a counterbalance assembly 130 is shown. As best shown in FIG. 4, the counterbalance assembly 130 includes a cam 132 coupled to the output shaft 116 so that the cam rotates in a first direction when the ramp portion 104 moves toward the stowed position and in a second direction when the ramp portion 104 moves toward a deployed position. As previously noted, the output shaft 116 can be any shaft configured to rotate in a first direction when the ramp portion 104 moves toward the stowed position, and in a second direction when the ramp portion moves toward the deployed position. Additional alternate embodiments are also possible wherein the cam 132 is not coupled to an output shaft, but is otherwise associated with the ramp portion 104, directly or indirectly, so that the cam rotates in a first direction when the ramp portion 104 moves toward the stowed position, and in a second direction when the ramp portion moves toward the deployed position.

A resistance member 138 is coupled to the ramp assembly 100. The resistance member 138 includes a restraint 160 attached to the ramp assembly such that the restraint 160 maintains a fixed position relative to the fixed portion 102 of the ramp assembly 100. The restraint 160 has an end stop 166, which maintains a fixed position relative to the restraint. In the embodiment shown in FIG. 4, the restraint 160 has an elongate body extending along the side of the ramp assembly, and the end stop 166 is integrally formed therewith. The form and orientation of the illustrated elongate body end stop are exemplary only, and should not be considered limiting. In this regard, various changes to the shape and configuration of the body and end stop are contemplated and should be considered within the scope of the present disclosure. Moreover, the end stop need not be integrally formed with the restraint, but can instead be a separate fitting coupled to or otherwise associated with the restraint.

Still referring to FIG. 4, the distal (roadside) end of the restraint 160 is coupled for rotational movement about an axis of rotation 142, which is fixedly positioned relative the fixed portion 102 of the ramp assembly 100. The proximal (curbside) end of the restraint 160 is coupled to a guide 170, which is fixedly secured to a fixed portion 102 of the ramp assembly 100. Thus, the restraint 160 is fixedly attached to the fixed portion 102 of the ramp assembly 100. It should be appreciated that the 160 can be coupled to a fixed portion of the ramp assembly in any suitable manner. Further, the restraint 160 need not be attached to the fixed portion 102 of the ramp assembly 100, but can instead be coupled to a portion of the vehicle to which the ramp assembly 100 is mounted or to any other structure that maintains a fixed position relative to the neutral position of the ramp portion 104.

A drive element 140 is slidably associated with the restraint 160. A spring fitting 146 is associated with the drive element 140 to move with the drive element when the drive element slides relative to the restraint 160. In the illustrated embodiment, the drive element 140 is an elongate rod received within an interior portion of the restraint 160, and the spring fitting 146 is disposed on the rod. It should be appreciated that the drive element 140 and spring fitting 146 can take any number of various forms and configurations without departing from the scope of the present disclosure. Moreover, the spring fitting 146 can be a separate fitting that is coupled to the drive element 140 or can be a feature integrally formed with the drive element.

A compression spring 180 is disposed between the end stop 166 and the spring fitting 146. In the illustrated embodiment, the drive element 140 (rod) is concentrically disposed within the compression spring 180. Movement of the drive element 140 in a first direction moves the spring fitting 146 toward the end stop 166, which results in the compression spring 180 being compressed between the spring fitting and the end stop. Movement of the drive element 140 in a second direction, opposite the first direction, moves the spring fitting 146 away from the end stop 166, which results in the compression spring moving toward or maintaining its uncompressed state. While the disclosed compression spring is shown as a coil spring, alternate embodiments that use a pneumatic cylinder, a hydraulic cylinder, or any other suitable energy storage device are contemplated and should be considered within then scope of the present disclosure.

The embodiment shown in FIG. 4 includes a second end stop 266, which maintains a fixed position relative to the restraint, and a second spring fitting 246 associated with the drive element 140 to move with the drive element when the drive element slides relative to the restraint. A second compression spring 280 is disposed between the second end stop 266 and the second spring fitting 246 so that movement of the drive element 140 in the first direction moves both the first and second spring fittings 146 and 246 toward the first and second end stops 166 and 266, respectively. As a result, the first and second compression springs 180 and 280 act in parallel to provide a force that biases the drive element 140 in the second direction. It should be appreciated that the use of two springs in parallel is exemplary only and should not be considered limiting. In this regard, a single spring can be utilized. Alternatively, three, four, or any other suitable number of springs in parallel can also be used. These and other variations to the number and arrangement of the springs are contemplated and should be considered within the scope of the present disclosure.

Still referring to FIG. 4, a cam follower 134 is attached to the proximal (curbside) end of the drive element 140. In the illustrated embodiment, the cam follower is a roller bearing that rollingly engages the cam surface 136 of the cam 132. The use of alternative cam followers, including flat-face followers, spherical-faced followers, and any other known cam follower configuration is also contemplated and should be considered within the scope of the present disclosure. The springs 180 and 280 of the resistance member 138 bias the drive element 140 so that the cam follower 134 maintains contact with the surface 136 of the cam 132 as the ramp portion 104 reciprocates between the stowed position and a deployed position.

The cam follower 134 is at least partially disposed within a first slot 172 formed in the guide 170. In the illustrated embodiment, the first slot is generally vertical and is sized and configured to allow the cam follower 134 unrestricted movement through the cam follower's full range of motion as the ramp portion 104 reciprocates between the stowed position and the deployed position.

A bearing member 190 is coupled to the drive element 140 and engages the guide 170 to limit motion of the drive element in at least one direction. In the illustrated embodiment, the bearing member 190 is a roller bearing mounted coaxially with and proximate to the cam follower 134. The bearing member 190 is disposed within an elongate second slot 174 formed in the guide 170. As the ramp portion reciprocates between the stowed position and the deployed position, the roller bearing rollingly engages at least one surface of the second slot 174 to maintain motion of the drive element 140 along a substantially linear path. In the illustrated embodiment, a second bearing member 192 is mounted opposite to the first bearing member 190. The second bearing member 192 is disposed within a portion of the elongate second slot 174 opposite the first bearing member 190 and functions in a similar manner to the bearing member 190.

The bearing member 190 and guide 170 are not limited to the illustrated configuration. In this regard, the bearing member 190 can be a pin that slidingly engages the slot, a linear bearing, or any other suitable means for limiting the motion of the proximal end of the drive element 140 in a direction normal to the axis of rotation of the cam 132. Further, the number and location of the bearing members 190 and 192 is not limited to the disclosed embodiment, but can include a single bearing member or any other suitable number of bearing members. Moreover, although the guide 170 and slots formed therein are illustrated as a separate fitting, it should be appreciated that these features and any other features that maintain a fixed position relative to the fixed portion 102 of the ramp assembly 100 can be integrally formed with the fixed portion 102 of the ramp assembly 100 or its components.

Figure 8:
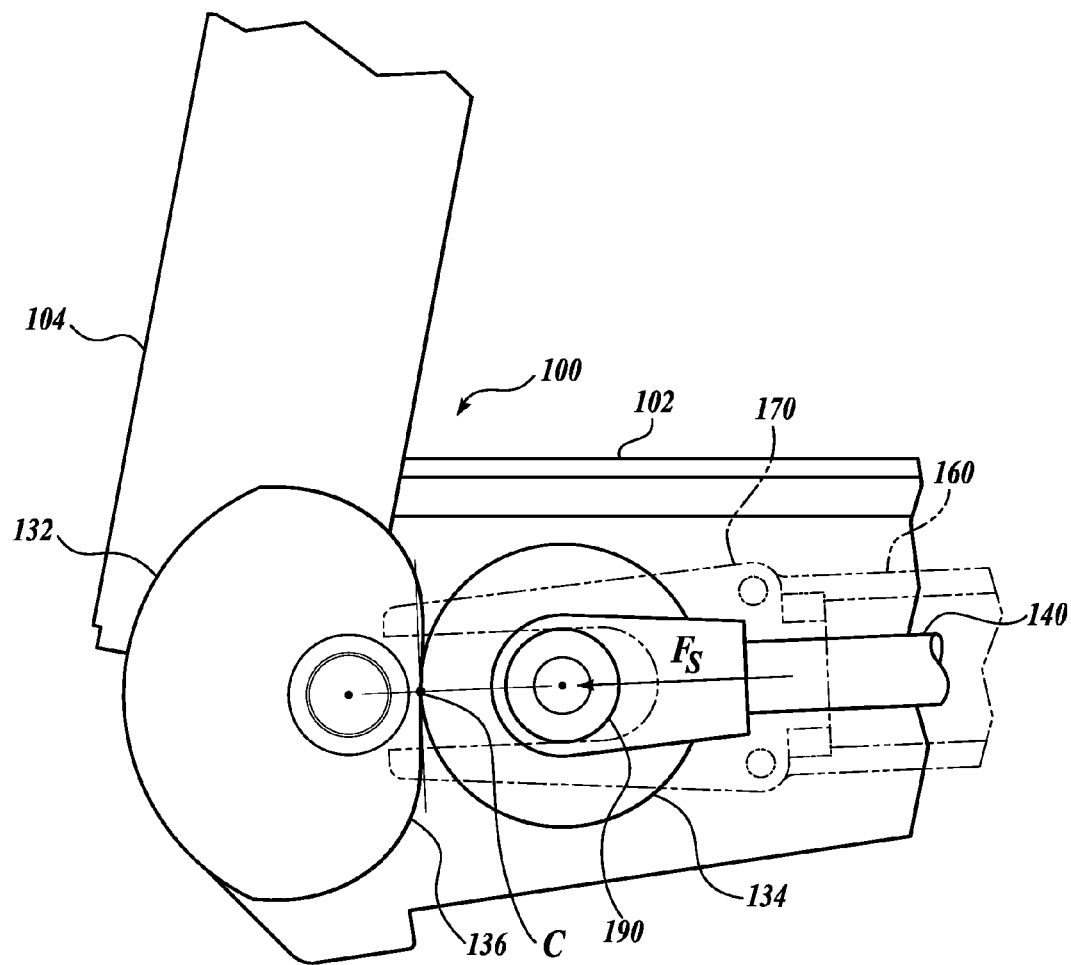
FIG. 8 shows a side view of the counterbalance assembly of FIG. 4, with the ramp portion in a neutral position.
Figure 9:
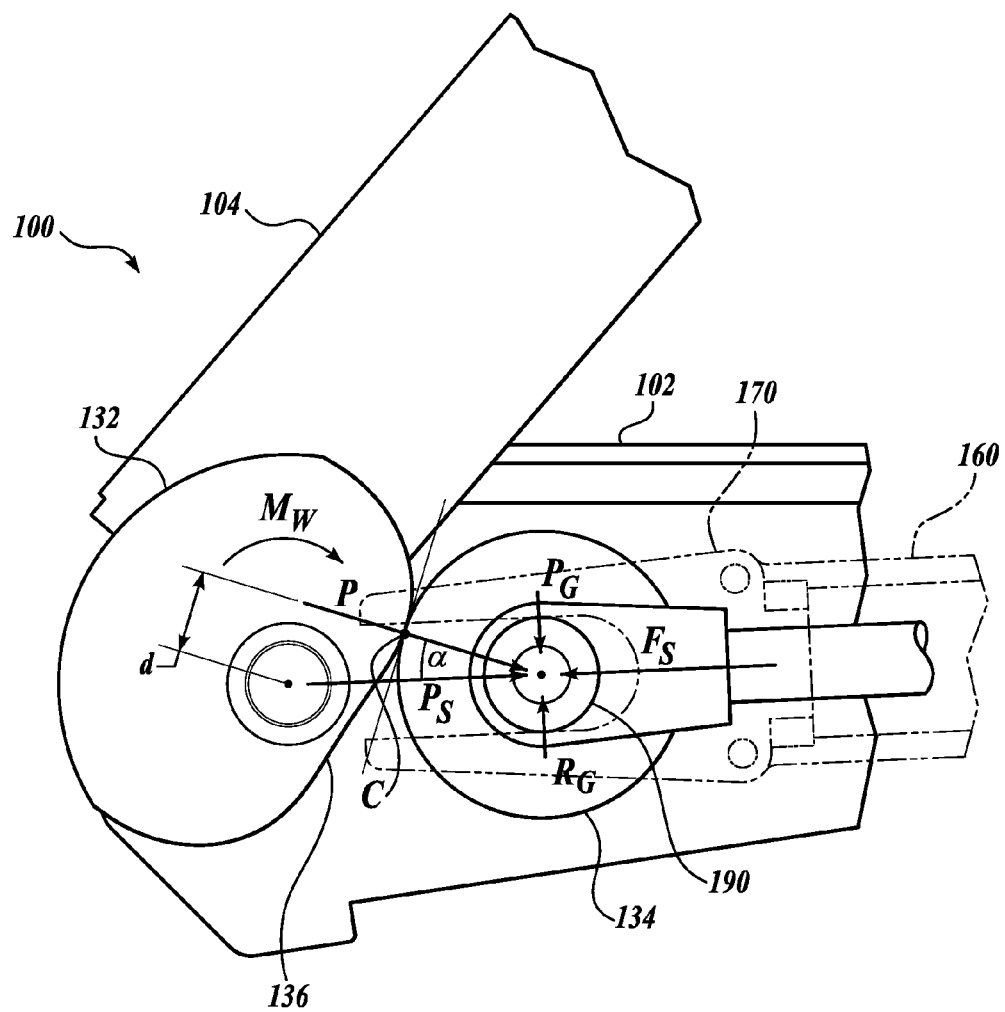
FIG. 9 shows a side view of the counterbalance assembly of FIG. 4, with the ramp portion between the neutral position and the stowed position.
Figure 10:
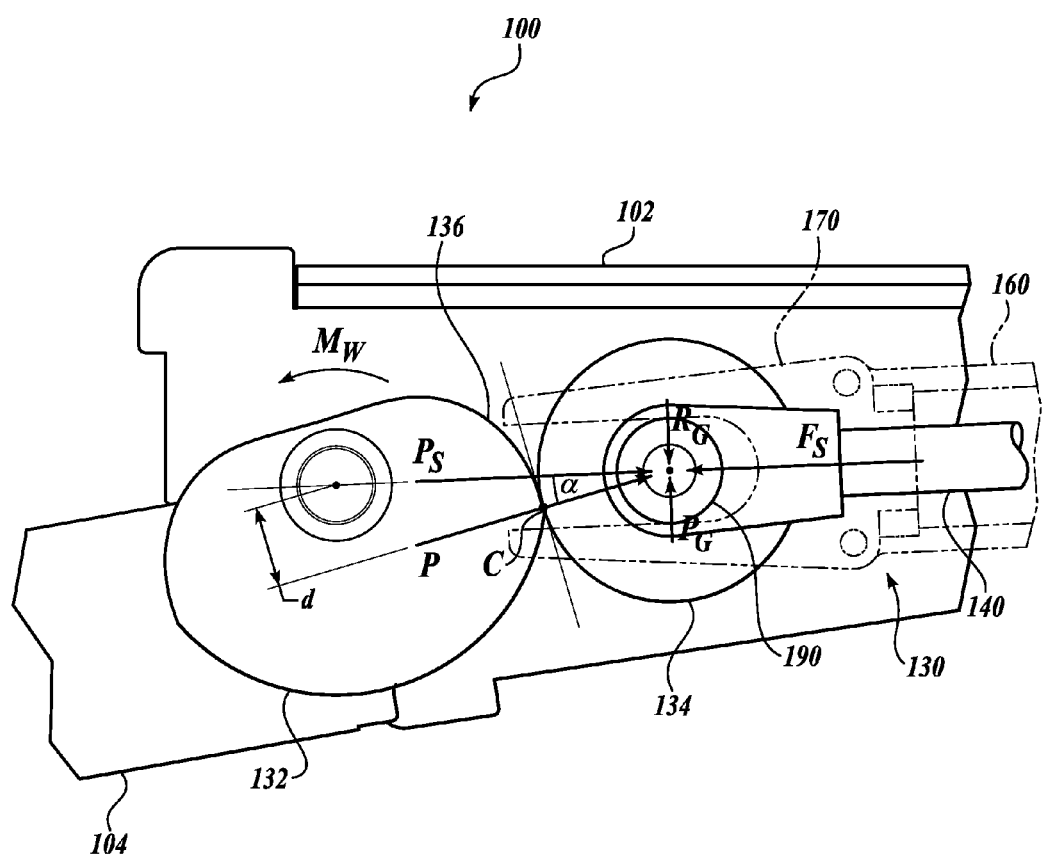
FIG. 10 shows a side view of the counterbalance assembly of FIG. 4, with the ramp portion in a deployed position.

Referring to FIGS. 8-10, operation of the counterbalance assembly 130 will now be described. As shown in FIG. 8, when the ramp portion 104 is in the neutral position, the cam follower 134 contacts the cam surface 136 at point C. The resistance member 138 provides a spring force $F_S$, which acts through point C in a direction that is normal to the surface of the cam follower 134 at point C. With the ramp portion 104 in the neutral position, the spring force $F_S$ acts through the center of rotation of the cam, and therefore does not impart a moment on the cam to bias the ramp portion away from the neutral position. Because the CG of the ramp portion 104 is located above the center of rotation of the ramp portion when the ramp portion is in the neutral position, the ramp portion will remain balanced in the neutral position until acted upon by the drive assembly or some outside force.

Referring now to FIG. 9, As the ramp portion 104 moves toward the stowed position, the ramp moment $M_W$ imparted by the CG of the ramp portion tends to rotate the ramp toward the stowed position. The surface 136 of the cam 132 contacts the cam follower 134 at point C, and the ramp moment $M_W$ results in a force P being applied to the cam follower by the cam. Force P acts normal to the surface of the cam follower 134 at point C and has a magnitude such that $P=M_W \div d$, wherein d is the moment arm of $M_W$ about the axis of rotation of the cam 136. In order to counterbalance the ramp portion 104, the counterbalance assembly 130 reacts force P, thereby counteracting the tendency of the ramp moment $M_W$ to move the ramp further toward the stowed position.

Still referring to FIG. 9, the force $F_S$ provided by the counterbalance spring acts along a line that is normal to and intersects the axis of rotation of the cam and the axis of rotation of the cam follower. For any given ramp position, the force P acts at a pressure angle $\alpha$ to this line. The force P can be resolved into two components: (1) $P_S$, which is parallel to the counterbalance force $F_S$ and is defined by the equation $P_S = P \cos \alpha$; and (2) $P_G$, which is normal to $P_S$. and is defined by the equation $P_G = P \sin \alpha$.

As the ramp portion 104 moves toward the stowed position, the magnitude of the ramp moment $M_W$ increases with the sine of the angle of the ramp relative to vertical. At the same time, the force $F_S$ provided by the counterbalance assembly 130 increases proportionally with the compression of springs 180 and 280. Thus, the contour of the cam surface 136 can be developed and the stiffness of the springs can be selected such that for any given ramp position between the neutral position and the stowed position, the force $F_S$ provided by the compression springs 180 and 280 is equal to or approximates the force $P_S$ that results from the ramp moment $M_W$ imparted by the CG of the ramp portion 104.

While the compression springs 180 and 280 counteract the force $F_S$, the guide 170 provides a reactive force $R_G$ to counteract the component $P_G$ of force P. Still referring to FIG. 9, the one or more bearing members 190 rollingly engage the edge of the slot 174 in the guide as the ramp portion 104 reciprocates between the neutral position and the stowed position. The guide 170 is sized and configured to react at least the maximum value of force $P_G$. Thus, as the ramp portion 104 reciprocates between the neutral position and the stowed position, the bearing member 190 maintains contact with the guide 170 and provides the reactive force $R_G$ to counteract force $P_G$. Because $R_G$ is a reactive force, it increases and decreases in response to increases and decreases in the magnitude of force $P_G$.

Referring now to FIG. 10, when the ramp portion 104 is between the neutral position and a deployed position, the ramp moment $M_W$ tends to rotate the ramp portion toward the deployed position. The ramp moment $M_W$ imparts force P to the cam follower 134 through point C in a direction that is normal to the surface of the cam follower at point C. Similar to when the ramp portion is between the stowed position and the neutral position, component force PS is counteracted by the force $F_S$ provided by the spring or springs of the counterbalance assembly 130. Component force $P_G$ is counteracted by the reactive force $R_G$ provided by the guide 170 through the first and second bearing members 190 and 192.

By choosing one or more springs with appropriate stiffness, and then developing a suitable cam profile, it is possible to provide a counterbalance assembly that precisely counteracts the ramp moment $M_W$ created by the weight of the ramp portion in every ramp position between the stowed position and a deployed position. When the moment is exactly counteracted, the ramp portion 104 has an effective weight of zero, and the net moment resulting from the weight of the counterbalanced ramp is also zero. In other words, the ramp portion can remain in any position between the stowed position and the deployed position based solely on the counterbalancing effect of the ramp. As a result, the size of the motor and transmission assembly 110 can be reduced because the ramp portion 104 does not have to be supported when the ramp portion is between the stowed position and the neutral position, and between a deployed position and the neutral position.

Although the counterbalance assembly 130 can be designed to counteract the entire ramp moment $M_W$ resulting from the weight of the ramp portion, i.e., the net moment is zero, other embodiments are envisioned wherein only a portion of the ramp moment $M_W$ is counteracted by the counterbalance assembly so that the net moment is a portion of the uncounterbalanced moment, i.e., moment that would result from the weight of the ramp portion absent the counterbalance. For example, a counterbalance can be provided wherein the net moment resulting from the counterbalanced ramp portion 104 is 95% of the uncounterbalanced moment. Other variations are possible wherein the net moment is any desired percentage of the uncounterbalanced moment, including 90%, 75%, 50%, or any others suitable percentage. Moreover, the counterbalance can be provided such that the net moment is not a fixed percentage of the uncounterbalanced moment throughout the range of ramp motion, but instead varies up to a predetermined maximum value. These and other variations are contemplated and should be considered within the scope of the present disclosure.

The invention claimed is:

1. A ramp assembly, comprising:
   (a) a ramp portion, the ramp portion being configured for reciprocating movement between a stowed position, a deployed position, and a neutral position, the ramp portion having a weight that produces a ramp moment, the ramp moment biasing the ramp portion (1) toward the deployed position when the ramp portion is between the deployed position and the neutral position, and (2) toward the stowed position when the ramp portion is between the stowed position and the neutral position; and
   (b) a counterbalance associated with the ramp portion, comprising:
      (i) a cam configured to rotate when the ramp portion moves between the stowed position and the deployed position;
      (ii) a guide coupled to the ramp assembly;
      (iii) a cam follower slidingly coupled to the guide and engaging a surface of the cam, wherein rotation of the cam translates the cam follower along a path; and
      (iv) a resistance member coupled to the cam follower, the resistance member providing a force to the cam follower to counteract the ramp moment,
      wherein the counterbalance biases the ramp portion (1) toward the stowed position when the ramp portion is between the deployed position and the neutral position, and (2) toward the deployed position when the ramp portion is between the stowed position and the neutral position.

2. The ramp assembly of claim 1, wherein the cam follower comprises a roller bearing rollingly engaging the surface of the cam.

3. The ramp assembly of claim 1, wherein the guide comprises a slot.

4. The ramp assembly of claim 3, wherein the counterbalance further comprises a bearing member coupled to the cam follower and at least partially disposed within the slot.

5. The ramp assembly of claim 4, wherein the bearing member is maintained within the slot to limit movement of the cam follower in at least one direction when the ramp portion reciprocates between the stowed position and the deployed position.

6. The ramp assembly of claim 1, wherein the path comprises a straight line.

7. The ramp assembly of claim 1, wherein the resistance member comprises one of the group consisting of: a pneumatic cylinder, a hydraulic cylinder and a compression spring.

8. The ramp assembly of claim 1, the counterbalance further comprising a shaft configured to rotate in a first direction when the ramp portion moves toward the stowed position and in a second direction opposite the first direction when the ramp portion moves toward the deployed position, wherein the cam is coupled to the shaft.

9. The ramp assembly of claim 1, wherein the counterbalance counteracts at least a portion of the ramp moment to define a net moment.

10. The ramp assembly of claim 9, wherein the net moment is no greater than 10% of the ramp moment as the ramp portion reciprocates between the stowed position and the deployed position.

11. The ramp assembly of claim 9, wherein the net moment is no greater than 5% of the ramp moment as the ramp portion reciprocates between the stowed position and the deployed position.

* * * * *